Sept. 15, 1953     A. BOCCI     2,652,124
STEERING GEAR FOR TRAILERS
Filed Feb. 17, 1948     2 Sheets-Sheet 1
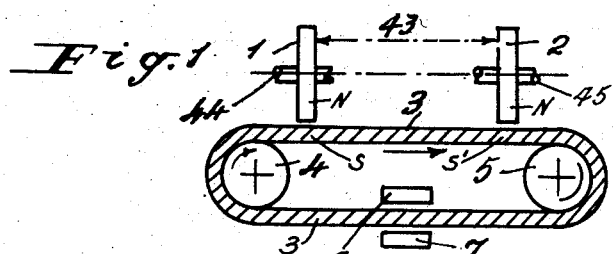
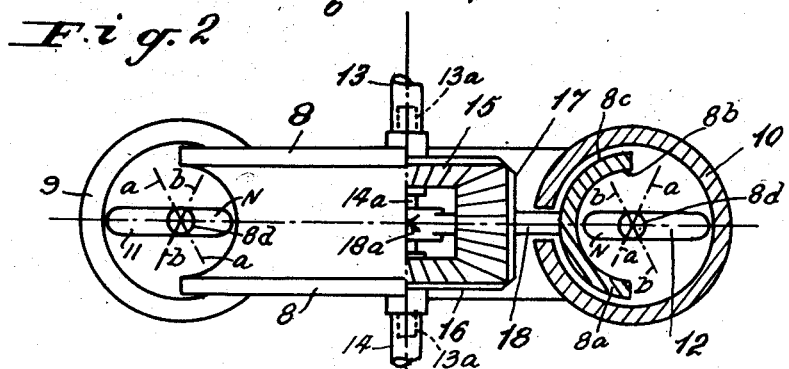
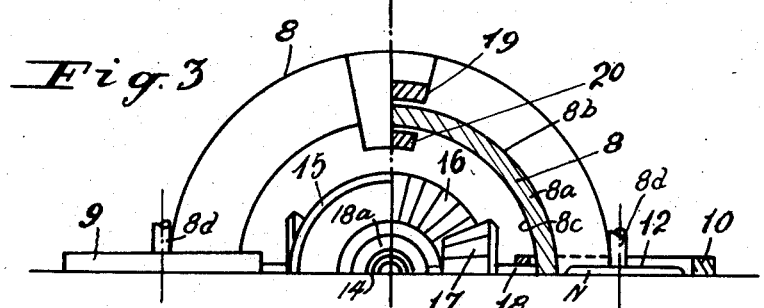
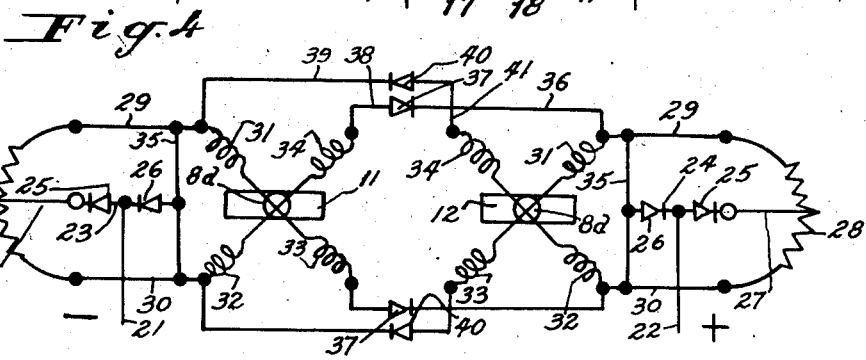
INVENTOR.
ADELCHI BOCCI
BY Mock & Blum
ATTORNEYS Sept. 15, 1953     A. BOCCI     2,652,124
STEERING GEAR FOR TRAILERS Filed Feb. 17, 1948     2 Sheets—Sheet 2

INVENTOR.
ADELCHI BOCCI
BY Mock & Blum
ATTORNEYS

Patented Sept. 15, 1953

2,652,124

UNITED STATES PATENT OFFICE 2,652,124

STEERING GEAR FOR TRAILERS

Adelchi Bocci, Florence, Italy

Application February 17, 1948, Serial No. 8,946
In Italy December 11, 1944

3 Claims. (Cl. 180—14)

This invention relates to the steering of trailers being towed by a tractor.

More particularly the invention relates to tractor supported magneto-mechanical means for governing the action of the steering wheels of a trailer being towed by such tractors.

One important object of the invention is to provide a tractor supported magneto-mechanical governing device wherein provision is made to effect delayed action on the steering wheels of a trailer until the trailer steering wheels arrive at the same point at which turning of the tractor steering wheels is effected.

A second important object of the invention is to make provision that the delayed action means in the governor shall be truly proportional to the distance between the steering wheels of a tractor and the steering wheels of the trailer.

A third important object of the invention is to provide means whereby the movement of a magnet in the governor will be transmitted to a magnet on the trailer controlling the action of the trailer steering wheels.

With the above and other objects in view the invention consists in general of certain mechanical arrangements and magnetic devices associated therewith, together with electrically conductive means connecting mechanism on a trailer to that on a tractor, the mechanical, magnetic and electro means being hereinafter fully described, illustrated in the accompanying drawings and particularly claimed.

In the accompanying drawings, like characters of reference indicate like parts in the several views, and:

Fig. 1 is a schematic view illustrating the principles upon which this invention operates.

Fig. 2 is a view partially in plan and partially in horizontal section and showing a governing mechanism used in this invention and supported on a tractor.

Fig. 3 is a fragmentary side elevation of the parts shown in Fig. 2.

Fig. 4 is a diagrammatic view showing the electro-circuit for balancing the magnetizing magnet and the magnetized magnet.

Figure 7:
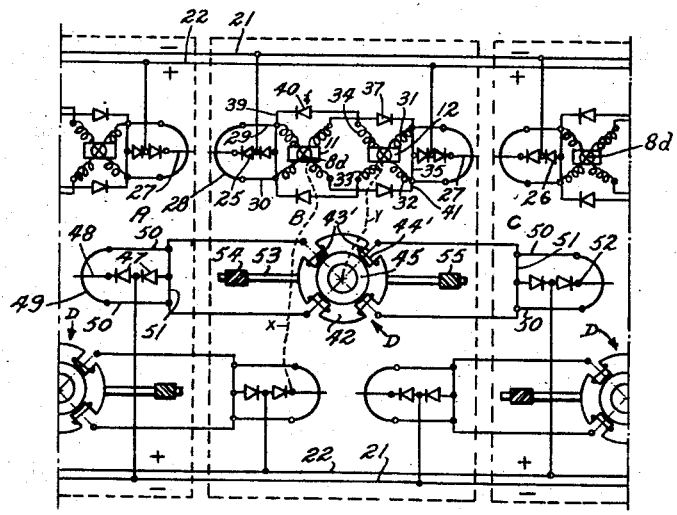

Fig. 7 is a diagrammatic view showing the electromagnetic means for controlling the steering of a plurality of trailers drawn behind a single tractor and so arranged that the steering wheels of the several trailers are successively delayed in action until they arrive at the same road point at which the steering wheels of the tractor are changed to all directions of movement of the tractor and train connected trailers.

The principle on which the present invention acts is essentially embodied in a governor device which is shown in Fig. 1.

It will be observed from this figure that a pair of spaced magnets, 1 and 2, are arranged at right angles to a belt 3. This belt is supported on rollers or drums 4 and 5 and one of these drums is assumed to be driven from the driving wheels of a tractor, the direction of rotation being the same as the direction of rotation of the tractor driving wheels. As here shown, the arrows in Fig. 1 indicate the direction of travel of the belt 3 and the tractor as a whole. The belt 3 is made of material capable of taking a high degree of magnetization. The distance 43 between the magnets 1 and 2 is made in practice proportional to the distance between the steering wheels of the tractor and the steering wheels of the trailer. The magnet 1 is controlled in position relative to the belt 3 by the action of the steering mechanism of the tractor, no part of this steering mechanism being necessary to be shown to effect understanding of the governing mechanism. Similarly the magnet 2 has connecting means indicated in general at 45 whereby change in the position of the magnet 2, relative to the belt 3, will cause alteration in the position of the trailer steering wheels corresponding exactly in extent and location to any change of direction caused in the steering wheels of the tractor. Now let it be supposed that the belt 3 is moving in the direction indicated by the arrow. The magnets 1 and 2 are indicated as having like poles N adjacent the belt 3. As the belt passes under the pole N, the proximity of the magnet to the belt will effect a magnetization as at S. This magnetized area will travel with the belt until it passes beneath the pole N of the magnet 2 as indicated at S'. If the magnet 1 is moved into more or less angular position relative to the belt 3, the magnetized pole S will be formed with its center in position laterally of the belt to agree with the position of magnet 1. Now, when this magnetized area passes beneath the magnet 2, the most strongly magnetized part of the belt 3 will cause the magnet 2 to assume the same position as was the magnet 1 at the time of the magnetization of the area S.

It is, of course, obvious that the location of the area S will be constantly changing as the driver of the tractor changes the position of the steering wheels and that the differential variations in the position of the magnet 1 will be duplicated by the magnet 2 upon the differential variations in the lateral position of the successive magnetized areas S.

In Fig. 1 there is also indicated a demagnetizing device as shown at 6 and 7, the purpose of this being that as the belt passes under the magnet 1, it will be free from any residual magnetism.

In practice, utilization of a belt such as that shown in Fig. 1, at 3, would be undesirable and impractical. In the governor shown in Figs. 2 and 3 a suitable mechanism is disclosed, avoiding the impracticability just noted. In this mechanism there is provided a ring 8. In cross section this ring 8 is arcuate in form, the cross section of the ring being shown at 8a, as a semicircle having a concave side 8b and a parallel convex side 8c. Supported at opposite points on the diameter of the ring are shafts 8d, which shafts carry respectively magnets 11 and 12, these magnets being tiltable into positions varying from the lines a—a to the lines b—b. The magnets are supported adjacent their center with like poles N adjacent the convex surface 8b. The tilting movement of one of the magnets is effected by a suitable connection with the steering gear controlling the steering wheels of the tractor. Centrally of the ring 8 is a pair of shafts 13 and 14 positioned on the axis of revolution of the ring 8. These shafts 13 and 14 are provided with sockets or bearings 13a, in which is journalled a shaft 14a. The shafts 13 and 14 carry respectively bevelled gears 15 and 16. Extending radially inward from the ring 8 is a shaft 18 whereon is mounted a bevelled gear 17 meshing with the gears 15 and 16. The shafts 13 and 14 are driven by suitable mechanism (not shown) from the shafts of the driving wheels of the tractors. If the tractor moves in a straight line, its driving wheels will, as is usual, revolve in unison but if the tractor is driven on a curving line, one of the driving wheels will necessarily revolve faster than the other. It is to provide corresponding means that the differential gearing at 15, 16, and 17 is provided. It is to be noted that the shaft 18 is supported by a collar 18a mounted on a shaft 14a. With this construction, under normal circumstances, that is to say, with the tractor moving in a straight line, the gears 15 and 16 will rotate in unison and the ring 8 will be carried around the shaft 14a at the same angular speed as is attained by the gears 15 and 16. However, in moving on a curve these gears 15 and 16 will have a differential rotative movement so that the ring will be rotated on the shaft 14a at the mean of such movement.

In order to provide means to keep the magnetic field in the vicinity of each magnet, as tight as possible, split tubular keeper rings 9 and 10 are fixedly mounted to enclose the respective magnets and the splits, while permitting free passage of the shaft 18, allow the ends of the rings to lie close to the surface 8c of the ring 8.

At a suitable place adjacent the ring 8, demagnetizing means 19 and 20 embrace the ring.

The construction just described relative to Figs. 2 and 3 conforms in all respects to the principles described in relation to Fig. 1. Assuming that the magnet 11 is the energizing magnet 1, and assuming that the magnet 12 is the controlled magnet 2, as long as the tractor travels in a straight line, the positions of the magnets 11 and 12 will likewise be on a straight line, as shown clearly in Fig. 2. If, however, the driver of the tractor makes, for example, an extreme turn in one direction or the other, the magnet 11 will be shifted to have its center line lie on the line a—a or the line b—b. Now through suitable reductiton gearing disposed between the shafts 13 and 14 and the driving shafts of the tractor, the ring is caused to rotate in proportion to the speed of the tractor and the reduction gear is so arranged that the circumferential distance around the ring at its least diameter is such that the circumference is proportionately equal to the distance between the steering wheels of the tractor and the steering wheels of the trailer. With the magnet 11 in position on the line b—b the maximum center of the polarity S will be induced closely adjacent the side of the ring 8. As the ring is rotated through ½ a revolution, this area S is carried around until it comes opposite the magnet 12. There then is a strongly magnetic area S' acting on the pole N of the magnet 12 and causing that magnet to assume position on the line b—b. Obviously before the magnet 11 has moved from its normal position to take position on the line b—b, a magnetized path will be formed from the normal position to the position b—b and as the ring rotates a duplication of this magnetized path will pass close to the pole N of the magnet 12, and thus shift the magnet 12 exactly in time and position to the magnet 11. The shifting of the magnet 12 rotates the shaft 8d and by means suitably arranged, the rotation of this shaft will effect corresponding rotation of a magnet carrying shaft in the trailer as will be presently described.

Figure 5:
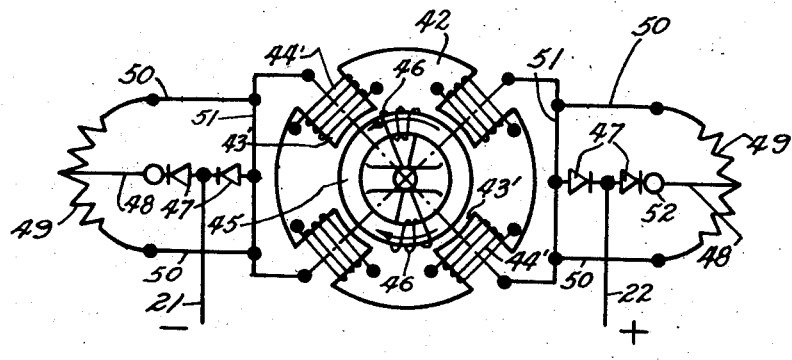
Fig. 5 is a diagrammatic view showing the circuit of a servo-motor used for actuating the trailer steering gear and showing the balancing circuit for said motor.

As shown in Fig. 4, the magnets 11 and 12 are illustrated, as well as the shafts 8d. At 21 and 22 are power supply lines which receive current from any suitable source of supply. These lines are connected to conductors 23 and 24 and connected to each of these conductors is a pair of rectifiers 25 and 26. Each rectifier is connected to a contact arm 27 which traverses a variable resistance member 28. Each of the variable resistances is connected at its ends by conductors 29 and 30 to one terminal of a pair of balancing coils 31 and 32, arranged axially and connected in series to respective balancing coils 33 and 34, likewise connected in series and disposed at right angles to the coils 31 and 32. Bridged between the conductors 29 and 30 are conductors 35 having connection with the respective rectifiers 26 at the central points of these conductors 35. Each coil 31 is connected through a conductor 36 to a rectifier 37, which is in turn connected by a conductor 38 to the corresponding coil 34. Likewise the other coil 31 is connected by a conductor 39 with a rectifier 40, which in turn is connected by a conductor 41 with the other coil 34. Similarly each coil 32 is connected through a rectifier and conductor 41 to a respective coil 33. With the construction just described manually moving the contacts 27 will so affect the magnets 11 and 12 that they will be balanced by the groups of 4 coils in such manner that under normal conditions of straight-forward driving the magnets will be alined and as the magnet 11 is biased by the action of the tractor steering mechanism the magnet 12 will be moved through an identical arc in the opposite direction. That is to say, if the magnet 11 is rotated in a clock-wise direction, the magnet 12 will be rotated in an anti-clock-wise direction. In Fig. 5 there is shown a stator 42 having poles 43' and pole windings 44'. At 45 is a rotor carrying the oppositely disposed windings 46. The device thus described is mounted on the trailer and is supplied with current from the leads 21 and 22. These leads are connected in multiple to rectifiers 47, one of which is connected conductively to a movable contact 48 traversing a variable resistance coil 49. Each variable resistance is connected by conductors 50 to the windings 46, in such manner that the strengths of these windings are controlled by the positions of the contact arms 48. At each side of the device in Fig. 5 the remaining rectifier 47 is connected to a bridge conductor 51, acting to bridge across the respective pair of conductors 50. As best seen in Fig. 7, wherein the same reference characters are used as have heretofore been used in relation to Figs. 4 and 5, the movable contact 48 is mounted on shaft 52, which is actuated by the movement of a respective shaft 8d controlling the actuated one of the magnets 11 and 12, which is biased by the action impressed on the ring 8 by the other of these magnets.

In Fig. 7 an arrangement is shown for the connection of three or more vehicles such as a tractor and two trailers and it will be noted that at the right of this figure the variable resistance coil 49 is carried by a tractor A, a similar variable resistance coil being carried on trailers B and C and each of the trailers having a servomotor indicated at D in general. As shown in Fig. 7 the shaft 8d of the magnet 11 is mechanically connected to the shaft 52 at the trailer end of the servo-motor controlling means and the shaft 8d of the magnet 12 is mechanically connected to the shaft of the rotor 45 as indicated respectively by the dotted lines X and Y. These dotted lines merely indicate a flexible shaft or other suitable mechanical shaft connecting means effecting driving of one shaft by another, no specific form of such drives being necessary to be here shown for the purposes of this invention.

Figure 6:
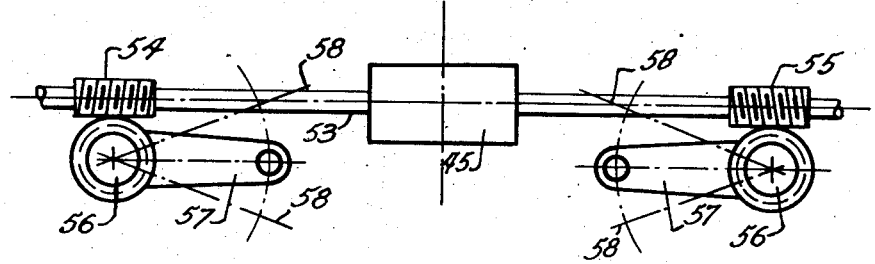
Fig. 6 is a schematic view showing means adapted to be used herein for simultaneously controlling a plurality of steering wheels.

In Fig. 6 means are shown for mechanically causing the action of the servo-motor to bias these settings of a pair of steering wheels. In this figure, the rotary member or rotor of the servo-motor is shown at 45 and this rotor is mounted on a shaft 53 carrying worms 54 and 55, the worm 54 having a left hand thread while the worm 55 has a right hand thread. These worms mesh with a pair of steering shafts 56 having arms 57 suitably connected to the steering wheels (not shown) to cause these wheels to bias simultaneously in positions which may be between any two desired angles as indicated by the center lines 58.

It is further to be observed that by the provision of the two variable resistances 49 the position of the rotor angularly with respect to the stator magnets may be properly adjusted, variation in current passing through the controlled contact arm being such as to properly govern the rotation of the rotor.

In the operation of this invention the ring is so connected to the driving wheels of the tractor that its speed of revolution (R. P. M.) is proportional to the speed of revolution (R. P. M.) of the driving wheels, such proportional rotation being constant through all speeds at which the tractor may travel. Also it is to be understood that the circumferential speed at which the ring 8 rotates is proportional to the distance from the point of contact of the tractor driving wheels with the ground to the point of contact of the trailer driving wheels with the ground in such manner that a magnetized point on the ring will move from the point of magnetization by one of the magnets 11 or 12 to the other at the time the trailer driving wheels arrive at the position on the road occupied by the tractor driving wheels at the instant of magnetization. These conditions being present steering rotation of that shaft 8d which is effected by movement of the tractor steering wheel by the driver will cause variation of the position of the magnet angularly so that the magnetized line on the rim 8a will follow the movement of the magnet, for instance 11. Upon the tractor having moved the distance between the tractor and trailer driving wheels the remaining magnet 12 will be affected by the variation of the magnetized line and its shaft 8d will be rotated a corresponding extent. This shaft 8d will correspondingly move the shaft 45 through its mechanical connection Y and thereby alter the electrical balance at the servo-motor. This effects corresponding movement of the rotor 45 and of the trailer steering wheels. If there is more than one trailer connected to the tractor to form a train each trailer unit is provided with the device shown in Figs. 2, 3 and 4 and the shaft 53 of the servo-motor is connected to the shaft 8d of the magnetizing magnet of that device through the mechanical connection X. This passes the action of the device to the next trailer behind.

What is claimed is:

1. In a governing device for controlling the steering of a trailer from a tractor, the tractor having steering and driving wheels and steering mechanism therefor and the trailer having steering wheels, a ring of highly magnetizable material, driving means for rotating said ring on an axis centrally of the ring at a linear speed proportional to the linear speed of the trailer over the ground, a magnet positioned opposite the ring at a first point on the circumference of the ring, said magnet being pivoted on an axis intermediate its poles, magnet biasing means connected to and actuated by the position of the steering mechanism and biasing the magnet about its pivotal axis in accordance therewith, a second similar magnet positioned opposite a second point of said ring and pivotally supported to be biased under the influence of and in accordance with the strength of the magnetism in the ring as it moves past said second magnet, said second point being located a distance around said ring from said first point proportional to the distance between corresponding axles of adjacent vehicles in the same ratio as the speed of the ring is proportional to the speed of the tractor, a servo-motor connected to the trailer steering wheels and governed by the biased position of the second magnet and controlling thereby the position of the trailer steering wheels, and a demagnetizing device in operative position relative to said ring in the arc extending from a point adjacent said second magnet to a point adjacent the first magnet and opposite the magnetized portion of said ring.

2. In a governing device for controlling the steering of a trailer from a tractor, the tractor having steering and driving wheels and steering mechanism therefor and the trailer having steering wheels, a ring of highly magnetizable material, driving means for rotating said ring on an axis centrally of the ring at a linear speed proportional to the linear speed of the trailer over the ground, a magnet positioned opposite the ring at a first point on the circumference of the ring, said magnet being pivoted on an axis intermediate its poles, magnet biasing means connected to and actuated by the position of the steering mechanism and biasing the magnet about its pivotal axis in accordance therewith, a second similar magnet positioned opposite a second point of said ring and pivotally supported to be biased under the influence of and in accordance with the strength of the magnetism in the ring as it moves past said second magnet, said second point being located a distance around said ring from said first point proportional to the distance between corresponding axles of adjacent vehicles in the same ratio as the speed of the ring is proportional to the speed of the tractor, said ring being arcuate in cross-section and the magnets being disposed to swing at one pole in the concave side of the ring, a servo-motor connected to the trailer steering wheels and governed by the biased position of the second magnet and controlling thereby the position of the trailer steering wheels, and a demagnetizing device in operative position relative to said ring in the arc extending from a point adjacent said second magnet to a point adjacent the first magnet and opposite the magnetized portion of said ring.

3. In a governing device for controlling the steering of a trailer from a tractor, the tractor having steering and driving wheels and steering mechanism therefor and the trailer having steering wheels, a ring of highly magnetizable material, driving means for rotating said ring on an axis centrally of the ring at a linear speed proportional to the linear speed of the trailer over the ground, a magnet positioned opposite the ring at a first point on the circumference of the ring, said magnet being pivoted on an axis intermediate its poles, magnet biasing means connected to and actuated by the position of the steering mechanism and biasing the magnet about its pivotal axis in accordance therewith, a second similar magnet positioned opposite a second point of said ring and pivotally supported to be biased under the influence of and in accordance with the strength of the magnetism in the ring as it moves past said second magnet, said second point being located a distance around said ring from said first point proportional to the distance between corresponding axles of adjacent vehicles in the same ratio as the speed of the ring is proportional to the speed of the tractor, said ring being arcuate in cross-section and the magnets being disposed to swing at one pole in the concave side of the ring, split keeper rings enclosing said magnets and having terminals enveloping and closely adjacent the convex sides of said ring, a servo-motor connected to the trailer steering wheels and governed by the biased position of the second magnet and controlling thereby the position of the trailer steering wheels, and a demagnetizing device in operative position relative to said ring in the arc extending from a point adjacent said second magnet to a point adjacent the first magnet and opposite the magnetized portion of said ring.

ADELCHI BOCCI.

References Cited in the file of this patent

UNITED STATES PATENTS

| Number | Name | Date |
| --- | --- | --- |
| 1,804,257 | Greenley | May 5, 1931 |
| 1,857,740 | Pinckard | May 10, 1932 |
| 2,070,832 | Johnson | Feb. 16, 1937 |
| 2,317,400 | Paulus et al. | Apr. 27, 1943 |
| 2,417,287 | Belo | Mar. 11, 1947 |